Oct. 13, 1964     D. E. GILCHRIST     3,152,371
METHOD AND APPARATUS IN SHELL MOLDING
Filed Nov. 17, 1960     10 Sheets-Sheet 1

FIG. 1

INVENTOR.
DAVID E. GILCHRIST
BY
Roger C. Johnson
ATTORNEYS

Oct. 13, 1964     D. E. GILCHRIST     3,152,371
METHOD AND APPARATUS IN SHELL MOLDING
Filed Nov. 17, 1960     10 Sheets-Sheet 3

*INVENTOR.*
DAVID E. GILCHRIST
BY
Roger C. Johnson
ATTORNEYS

Oct. 13, 1964   D. E. GILCHRIST   3,152,371
METHOD AND APPARATUS IN SHELL MOLDING
Filed Nov. 17, 1960   10 Sheets-Sheet 4

INVENTOR.
DAVID E. GILCHRIST
BY
*Roger C. Johnson*
ATTORNEYS

Oct. 13, 1964     D. E. GILCHRIST     3,152,371
METHOD AND APPARATUS IN SHELL MOLDING
Filed Nov. 17, 1960     10 Sheets-Sheet 5

INVENTOR.
DAVID E. GILCHRIST
BY
*Roger C. Johnson*
ATTORNEYS

INVENTOR.
DAVID E. GILCHRIST

ATTORNEYS

Oct. 13, 1964 D. E. GILCHRIST 3,152,371
METHOD AND APPARATUS IN SHELL MOLDING
Filed Nov. 17, 1960 10 Sheets-Sheet 8

FIG.12

INVENTOR.
DAVID E. GILCHRIST
BY
ATTORNEYS

FIG. 13

United States Patent Office 3,152,371
Patented Oct. 13, 1964

1

3,152,371
METHOD AND APPARATUS IN SHELL MOLDING
David E. Gilchrist, Riverdale, Iowa, assignor to Deere & Company, Moline, Ill., a corporation of Delaware
Filed Nov. 17, 1960, Ser. No. 70,007
28 Claims. (Cl. 22—20)

This invention relates generally to shell molding and has for its principal object the provision of means for carrying out shell molding in a substantially continuous fashion with a relatively large amount of automation and with a minimum of hand or manual operations.

A further feature of this invention is the provision of more or less automatic mechanism for producing shell molds within backing members at relatively great speed and the use of these backing members for the production of castings, the heat from the molten metal being employed to keep the backing members substantially up to temperature, utilizing heated patterns, and means for blowing resin-sand or the like into the respective spaces between the heated patterns and backing members and substantially immediately curing mold shells as they are formed therein.

These and other objects and advantages of this invention will be apparent to those skilled in the art after consideration of the following detailed description, taken in conjunction with the accompanying drawings, in which:

FIGS. 1 and 1a are general plan views of the shell molding apparatus incorporating the essentials of this invention.

FIG. 2 is an enlarged section when taken generally along the line 2—2 of FIG. 1a.

FIG. 7 is a side view of the conveyor track and flask member arrangement shown in FIG. 6, FIG. 7 corresponding to a view taken along the line 7—7 of FIG. 1a.

FIG. 8 is a fragmentary vertical elevation, with certain parts broken away, of the backing member receiving portion of the sand blowing machine and index table, corresponding generally to a view taken along the line 8—8 of FIG.1a.

FIG. 11 is an elevation of the flask-reversing or roll-over unit, being a view taken generally along the line 11—11 of FIG. 1a.

2

Figure 1:
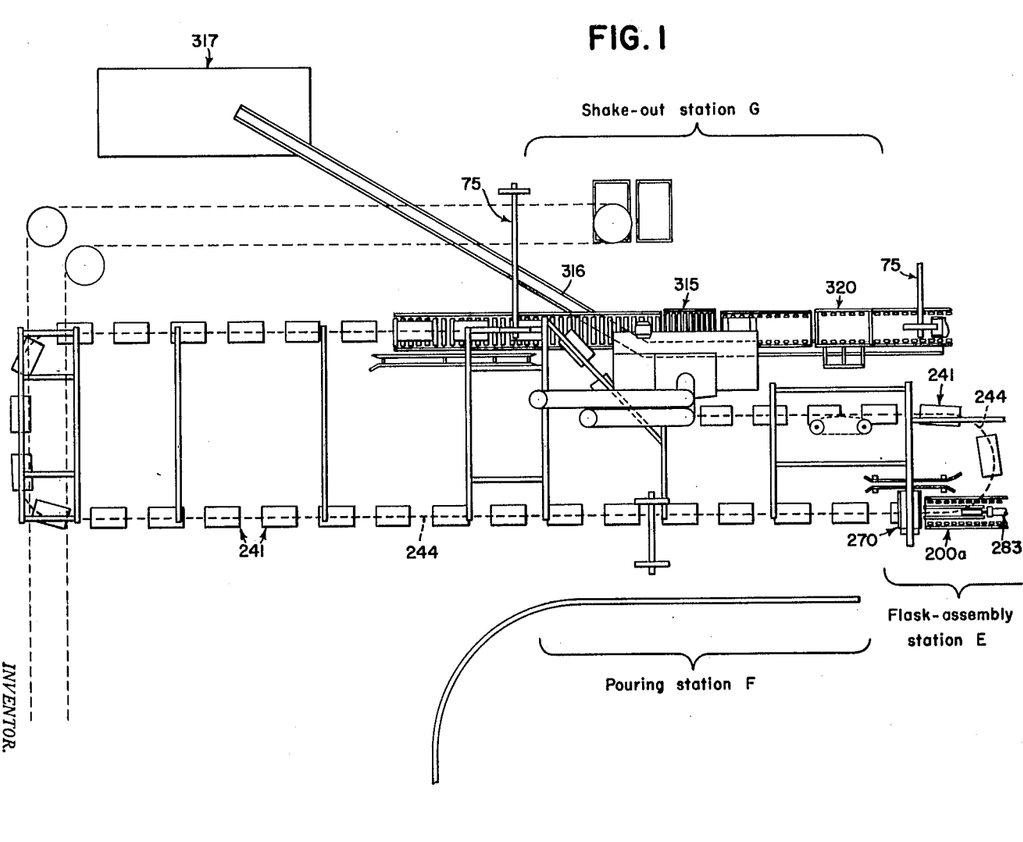

Referring first to FIGS. 1 and 1a, which show a general layout of our new and improved apparatus for producing castings by the shell molding process, according to our invention we provide a novel means and method for the continuous production of castings using the shell molding process. Viewed as a whole, the apparatus of this invention provides a flask return station A, a shell-blowing and curing station B, a shell-stripping and flask-reversing station C, a core setting station D, a flask-asembly station E, a pouring station F, and a shake-out station G.

At the flask return station A there are a plurality of flask racks 5, and also a plurality of flask preheat furnaces or ovens 11, a plurality of flask heating ovens or furnaces 12 and a flask return conveyor 13 are provided. The ovens 11 and 12 overlie flask conveyors 13a and 13b. The conveyor 13 comprises a suitable floor-supported frame 15 (FIG. 2) carrying a plurality of freely rotatable rollers 16 on which flasks or flask parts may be supported for movement. The flask return conveyor 13 generally parallels the adjacently disposed flask preheat oven 11. The latter includes hoods or housings 17 overlying a flask conveyor 13a that includes a floor supported frame 18 (FIG.2) having side bars 19 that support a plurality of pairs of axially alined rollers 21 that are freely rotatable, the hoods or housing 17 being disposed above a plurality of gas burners or other heating units (not shown). Each hood or housing 17 is provided with one or more stacks or vents 23.

Figure 2:
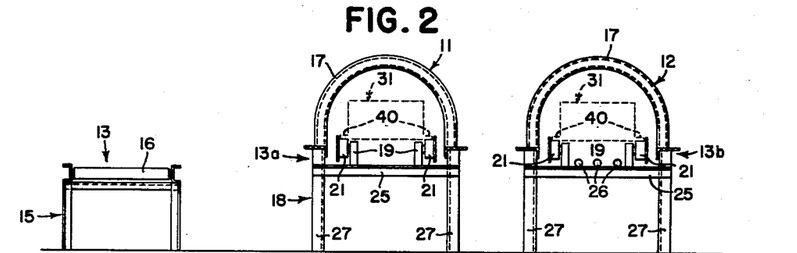

The service ovens or furnaces 12 are substantially identical with the ovens 11 just described, and as best shown in FIGS. 1a and 2, the latter series of ovens or furnaces overlie the conveyor 13b, the construction of which is substantially identical with the conveyor 13a, including side bars 19 carrying rollers 21. As will be seen from FIG. 1a, left hand portion, the entrance end of the conveyor 13b extends outwardly beyond the ovens or furnaces 12 so as to receive the cope and drag back-up members as they return from the casting operation, the latter still being hot from the heat of the molten metal contained during and following the pouring operation, although by the time the back-up members approach the ovens or furnaces 12 the casting has been removed therefrom. The oven burners are indicated in FIG. 2 by the gas lines or conduits 26 in FIG. 2. In both of the conveyors 13a and 13b, as will be seen from FIG. 2, the horizontal frame bars 19 are supported by suitable cross bars 25 and vertical legs 27. The hoods 17 readily accommodate the passage of flask parts, comprising alternatively cope and drag back-up member.

Figure 3:
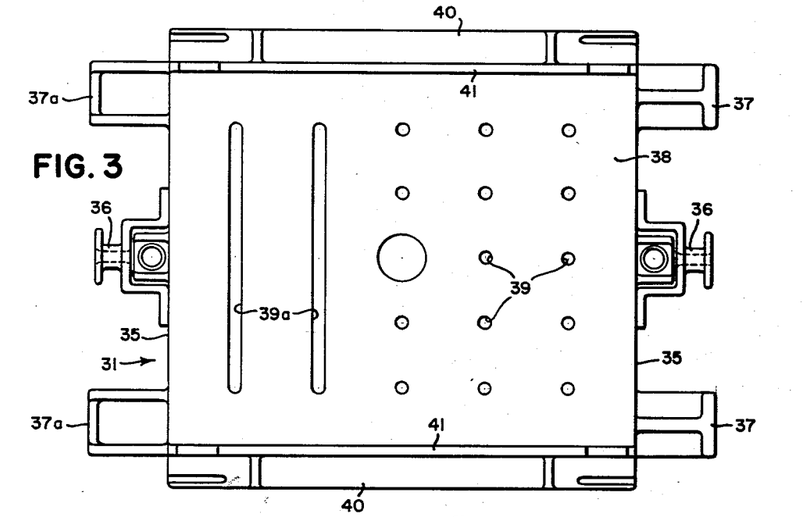
FIG. 3 is a top view of one of the shell-receiving backing members.
Figure 4:
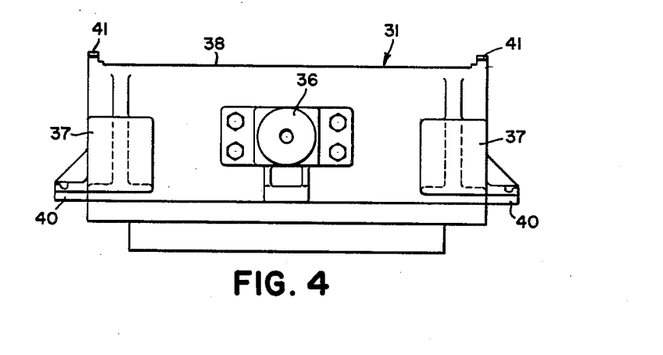
FIG. 4 is an end view of the backing members shown in FIG. 3.

Referring now to FIGS. 3 and 4, one of the flask parts or back-up members is indicated at 31 and preferably is in the nature of a box open at its lower side and having ends 35 carrying trunnions 36 and pairs of bumpers 37 and 37a. If desired both ends may carry the same kind of bumpers, either 37 or 37a. The top face of the back-up member has an upper machined surface 38 and one or more openings 39 and 39a by which shell molding sand can be blown into the back-up member when the latter is assembled with an associated pattern at the blowing station. The sides of the back-up members 31 carry laterally outwardly extending flanges 40 spaced and arranged to ride on the rollers 21 when the members 31 are moved along the conveyors 13a and 13b. In order to protect the smooth machined surface 38, against which the head of the blowing machine is brought at the blowing station as will be described below in detail, each back-up member 31 is provided with a flange 41 at each side, the flanges being spaced so as to ride on the rollers of the core-setting conveyor, which is substantially identical with the conveyor 13 mentioned above, during the passage of the back-up members, which are turned over at the reversing station, from the latter to the core-setting station.

Figure 5:
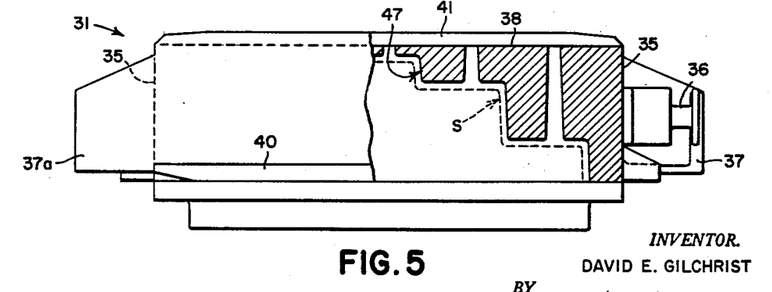
FIG. 5 is a side view, with parts broken away, of the backing member shown in FIG. 3.

The back-up members 31 are shifted along through the ovens or furnaces 12 by pusher means 45 (FIGS. 1a, 6 and 7), which will be described in detail below, the abutment projections 37 and 37a on the opposite ends of the back-up members 31 contacting the abutments on adjacent members so that other portions of the back-up members are protected during the movement of the back-up members through the ovens. As will be seen from FIG. 5, each back-up member 31 has a bottom wall section 47 that confirms generally to the shape of the shell S that is to be formed in the back-up member at the blowing station B (FIG. 1a).

It will be understood that the back-up members 31 are either cope back-up members or drag back-up members, depending on the shape and configuration of the shell to be formed therein at the blowing station B, and, further, that the cope and drag back-up members are substantially identical except as to the shape and design of the bottom wall section 47. In operation the cope and drag back-up members progress alternatively through the ovens 11 and are moved therethrough by virtue of the pushing or driving mechanism 45, mentioned above, which will now be described.

Figure 6:
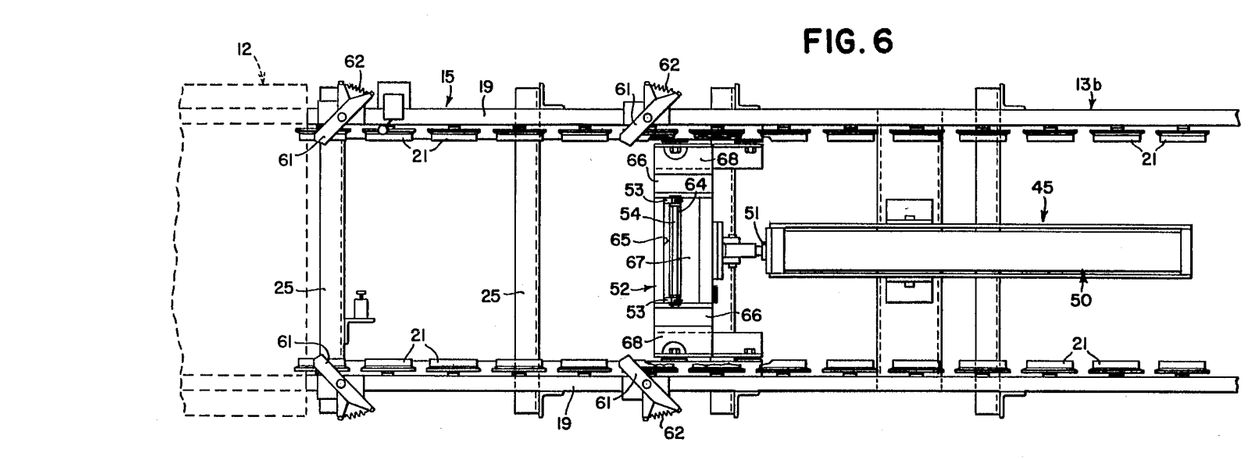
FIG. 6 is a plan view, on an enlarged scale, of the flask-shifting mechanism for moving the flasks or backing members through the ovens 11 toward the shell blowing and curing station, which lies to the left in FIG. 6.
Figure 7:
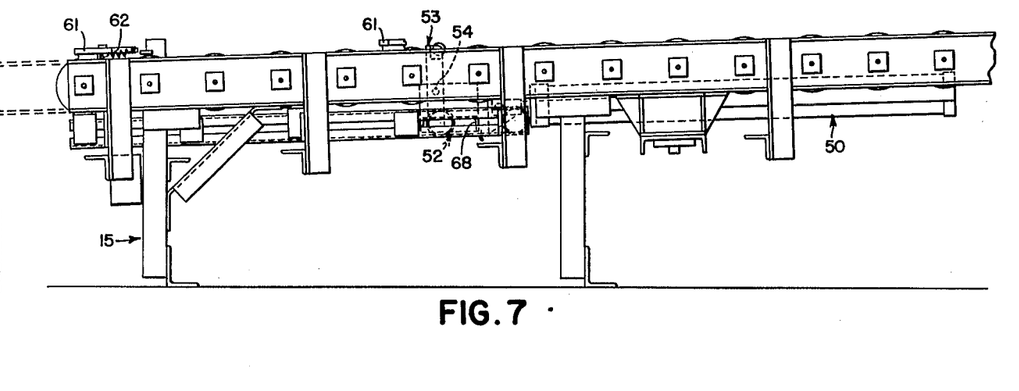

As will be seen from FIGS. 6 and 7, supported on the framework of the conveyor 13b is a power cylinder 50 carrying a piston rod 51 connected to a carriage 52 supported for longitudinal movement on the conveyor frame generally between the bars 19 and carrying a pair of latch or detent members 53 pivoted on a shaft 54 on the carriage and located so that when the cylinder 50 is extended the latch arms or detent members 53 engage the adjacent back-up member at opposite sides of the adjacent trunnion 36 and shift the back-up member 31, and all back-up members 31 in front of it, along the conveyor 13b toward the blowing station B. The stroke of the cylinder 50 is equal at least to the length of the back-up member 31.

According to this invention each back-up member 31 is retained in latch-receiving position by stop members 61 pivoted on the conveyor frame and biased by spring means 62 into a position to hold each back-up member in a position to receive the advancing latch arms 53. The portion of the conveyor 13b that leads to the flask advancing means from the shake-out station (FIG. 1) has a downward gradient (FIG. 7) which facilitates movement of the flasks to a point where they may be engaged by the arms 53, but from this point on through the ovens the conveyor has an upward gradient, which thus causes the flasks or back-up members to tend to return from the ovens 12 toward the shake-out station but this movement is prevented by the stop detents 61. As will be seen from FIGS. 1a and 6, there are two sets of detents 61 so that the flask or back-up member therebetween may readily be removed and replaced by another flask or back-up member, as when changing jobs, for example. The advancing detent arms 53 are counterbalanced by a lower interconnecting bar 64 so that the arms tend to return to a generally vertical position (FIG. 7). The arms 53 are held in the flask-advancing position by virtue of the lower ends engaging an edge 65 of an opening 67 in the channel 68 that forms the base of the carriage 52. The shaft 54 is supported by angle brackets 66 carried on the channel 68. The edge 65 forms, in effect, a one way stop. Thus, the arms 53 are disposed so as to successively engage the adjacent end 35 of each back-up member 31 and thus at each operation of the power cylinder 50 all of the back-up members are advanced through the furnaces 12 toward the blow station B.

As shown in FIG. 1a, at the blowing and curing station B, there is located a sand blowing machine 70 with an associated rotatable table 71, the latter having a number of index stations 73, each adapted, when the table 71 is in a given position, to receive a back-up member in heated condition from the discharge end of the conveyor 13b. It will be understood that in continuous operation, the back-up members enter the furnaces 12 while containing a substantial amount of heat from the immediately previous pouring and casting operations. The function of the oven or furnaces 12 is principally to make up any heat loss that may occur between the casting and pouring operations and the blowing and curing operation that takes place at station B. Of course, when initially starting up the apparatus, the back-up members may be brought up substantially to curing temperatures in the pre-heat furnaces 11 and then transferred by any suitable means, such as an over-head crane indicated generally diagrammatically at 75 in FIG. 1a, over to the conveyor 13b running through the sustaining ovens or furnaces 12, the crane being supported on overhead trolleys (not shown). The conveyor 13 in FIG. 1a supports back-up members, flasks and the like and serves as a storage therefor previous to their transfer to the pre-heat furnaces 11.

Figure 8:
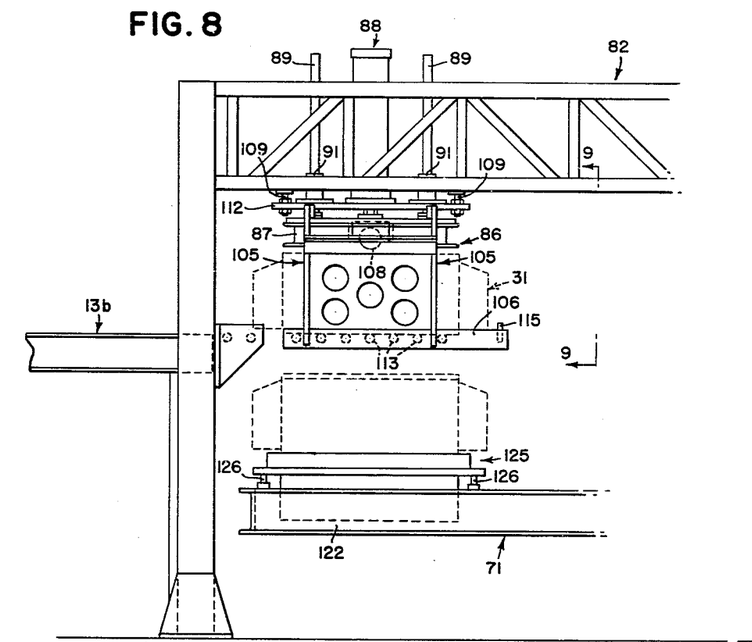
Figure 9:
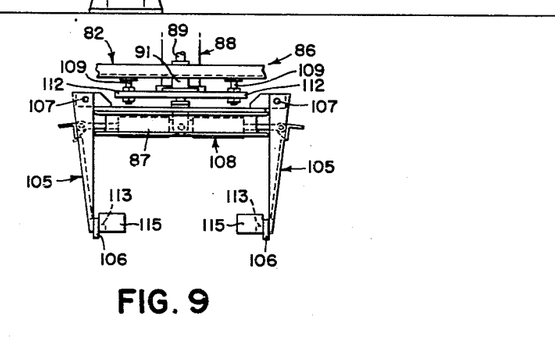
FIG. 9 is a fragmentary view taken along the line 9—9 of FIG. 8.

The sand blowing machine 70 and the associated rotatable table 71 form a part of a structure that includes a relatively stationary generally cruciform framework that, as indicated at 81, comprises a portion 82 that is disposed immediately adjacent the discharge end of the conveyor 13b as shown in FIGS. 1a and 8. The framework 81 comprises generally conventional angles, channels, columns and the like and the portion 82 provides means for supporting a vertically shiftable back-up member transfer carrier 86. As best shown in FIG. 8, this includes a carrier head 87 supported on the piston rod (not shown) of an air cylinder unit 88 carried in any suitable way by the framework 82. The vertically shiftable head 87 includes guide rods 89 that move upwardly through guide sleeve 91. Side members in the form of depending arms 105 having interconnecting lower horizontal bars 106 are swingably connected at the upper ends, as at 107 (FIG. 9), so as to be movable toward and away from flask-receiving positions. The bars 106 carry flask-receiving rollers 113. The side members 105 are shifted from one position to another by an air or hydraulic cylinder 108.

In the raised position of the head 87, abutment studs 109 engage portions of the adjacent framework. These studs are carried by bars 112 that form a part of the head 87 and are located so that in the raised position of the head 87 the studs 109 insure that the swingable members 86 will be swung toward one another and so dispose the rollers 113 in a position to receive and support a back-up member or flask as the latter is advanced beyond the discharge end of the conveyor 13b, as shown in dotted lines in FIG. 8. As best shown in FIG. 1a, the back-up members are successively advanced by a pusher unit 45a that is substantially identical, for all practical purposes, with the pusher member 45 described above. Hence, further description of the flask-advancing unit 45a is unnecessary. It will be understood, of course, that the pusher unit 45a advances the back-up members, one at a time, from the end of the conveyor 13b onto the rollers 113 of the carrier 86. The framework 82 and associated structure are so constructed and arranged that in the raised position of the carrier 86, the rollers lie substantially in the same horizontal plane as the associated portion of the conveyor 13b. The bars 106 carry stops 115 limit the movement of the flask members in the inward direction.

After a back-up member has been shifted onto the carrier 86, the cylinder 88 is actuated so as to lower the back-up member onto the table 71 of the blowing machine. As will be seen from FIG. 1a, the table 71 comprises a plurality of radially extending members 121 and interconnecting generally circumferentially extending members 122 suitably interconnected so as to form an integral structure. Through suitable driving and indexing means represented by hydraulic or air cylinder means 197, but which indexing means do not per se form a part of this invention, the table is advanced step by step from one index station to the other, the table shown in FIG. 1a having 12 index stations 73.

Figure 10:
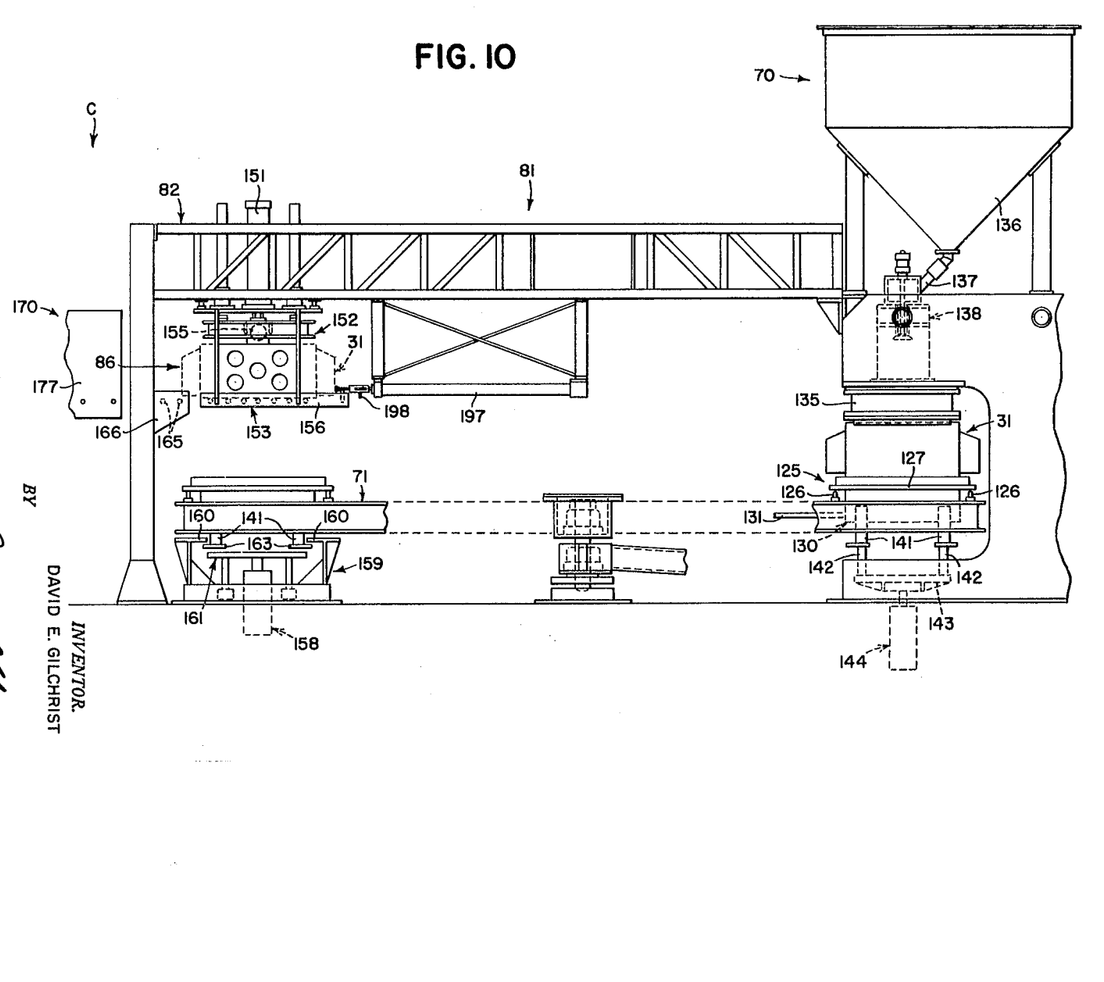
FIG. 10 is a view taken generally along the line 10—10 of FIG. 1a but with most parts shown in elevation or broken away, showing the mechanism for stripping the backing member and cured shell from the associated table-carried pattern.

Referring now to FIGS. 8 and 10, when the cylinder 88 is extended the back-up member 31 is lowered onto the table 71. At each of the index stations or pattern stations 73, the index table 71 carries a pattern 125, the framework of the table including a set of screw threaded studs 126 to receive the flange 127 of a pattern 125 and dispose the latter in the proper vertical position thereon. Each pattern carries or is fixedly associated with a burner box 130 that is provided with conventional heating means thermostatically controlled, the function of the burners in the burner box being to maintain the patterns continuously in a heated condition. Each burner box is connected with a suitable source of gas through a flexible connection 131 that accommodates some vertical movement of the burner box and pattern 125 relative to the index table 71. Normally, the pattern and burner box 130 rest on the studs 126.

As will be seen from FIG. 8 after the back-up member has been transferred from the conveyor 13b onto the carrier 86, the cylinder 88 lowers the flask or backing member 31 in direct engagement with the associated pattern 125. The table is then advanced step by step by any suitable means and eventually carries the pattern 125 and backing member through about 90° until the backing member comes under the blowing head 135, FIG. 10, of the blowing machine 70. The latter includes an upper hopper 136 having a lower conduit 137 leading downwardly to the blowing head 135 through a suitable valve controlled means 138. When the movement of the indexing table 71 has carried the back-up members and associated mating pattern 125 into the position shown in FIG. 10, right hand portion, means is provided for raising the pattern and backing member into firm contact with the lower face of the blowing head. The latter is so constructed that it contacts the upper flat machined face 38 of the backing member with such intimate contact that the resin-sand mixture is blown or discharged through the backing member opening 39, 39a or the like (FIG. 3) into the space between the heated back-up member and the associated heated pattern and no sand leaks out during the blowing operation. Means for maintaining firm intimate contact between the back-up member and the blow head 135 will now be described.

It will be seen from FIG. 10 that the burner box 130 carries a plurality of downwardly extending foot portions 141 that are adapted to be engaged by studs 142 extending upwardly from the head 143 of an air cylinder unit 144. Normally, the portions 141 clear the studs 142, so as not to interfere with the advance of the index table 71, but when the cylinder 144 is actuated, the studs 142 are raised and this lifts upwardly on the burner box 130 and acts through the latter to raise the pattern and the associated back-up member, carrying the upper face of the latter into tight engagement with the blow head 135. Through suitable timing means, shell molding sand is blown into the back-up member between the inner face of the latter and the pattern. The latter is maintained at a temperature of about 350° to 450° and, as mentioned above, the back-up members contain heat from the molten metal from the previous casting operation, plus any heat added thereto by the ovens 11. The temperature of the patterns and the back-up members is thus controlled so that almost as soon as the shell molding sand is blown into the space between the backing member and the pattern the shell is cured.

Since both the pattern and the back-up members are heated substantially to curing temperatures, curing of the mold shell between the back-up member and the pattern begins immediately and, depending on the desired or necessary thickness of the shell, is fairly well completed by the time the cylinder 144 is actuated to lower the burner box 130, the pattern 125 and the back-up member 31 downwardly away from the blowing head 135. As the lowering of the parts just mentioned occurs, the pattern flange 127 re-engages the adjustable studs 126 so that the burner box, pattern and back-up member are again supported on the table 71. The latter is then actuated step by step and, after a half revolution of the table 71 the pattern and back-up member, with cured shell in between, are brought to the stripping and flask-reversing station C. As best shown in FIG. 10 the first operation at this station is that of lifting the backing member with cured shell therein from the pattern 125. Mechanism for this purpose incorporates structure substantially the same as that supplied for the loading operation adjacent the blowing zone and described above in connection with FIG. 8. Briefly, an air cylinder 151 (FIG. 10) provides means for raising and lowering a back-up member clamping head 152 that carries a pair of swingable arms 153, lower portions of which are adapted to engage the backing member 31 in the same manner as described above in connection with FIG. 8. A cylinder 155 forms means to swing the arms 153 toward and away from one another for engaging and releasing the associated back-up member 31. When a backing member with cured shell therein and still carried on the associated pattern 125 reaches the stripping zone, the head 152 is lowered with the arms 153 spread apart and when the head 152 reaches its lowered position, the air cylinder 155 is actuated to retract the arms 153 causing the lower bars 156 thereof to engage under the sides of the backing member 31. The lower bars of the arms 153 carry rollers similar to those shown in FIGS. 8 and 9.

Due to the presence of the cured shell between the pattern and the back-up member, there is some tendency for the back-up member 31 to be held to the pattern 125. In order to facilitate stripping the back-up member, with the cured shell therein, away from the associated pattern, means is provided at the stripping or unloading zone C for momentarily locking the pattern 125 to the table 71. This means comprises an air cylinder 158 carried by or associated with a lower fixed structure 159 that includes a pair of upper spaced apart abutment plates 160 and a cylinder-actuated head 161 fixed to the piston of the cylinder 158 and normally disposed a distance below the abutment plates 160 and the burner box foot portions 141 so as not to interfere with normal movement of the table 71. Carried on the lower portion of the studs or extensions 141 on the burner box 130 is a pair of blocks or plates 163 that, when the table has advanced the back-up member and pattern to the unloading station C, lie underneath the abutment plates 160 and over the head 161. By actuation of the cylinder 158, the burner box, the pattern and the back-up member are raised until the blocks or plates 163 are forced firmly against the stationary abutment plates 160. This securely holds the pattern and burner box in fixed position. After this has been effected, the cylinder 151 is then actuated to raise the back-up member 31, with shell therein, away from the pattern member, which is retained in fixed position at this time the cylinder 158 and associated parts. The cylinder 151 is retracted until the back-up member is brought upwardly to the level of rollers 165 carried on brackets 166 fixed to the framework 81. The back-up member 31 can then be moved off the rollers on the lower ends of the arms 153 and the back-up member 31 then advanced from the unloading zone towards the flask-reversing mechanism or roll-over unit, indicated in its entirety in FIGS. 1a, 10 and 11 by the reference numeral 170.

Figure 11:
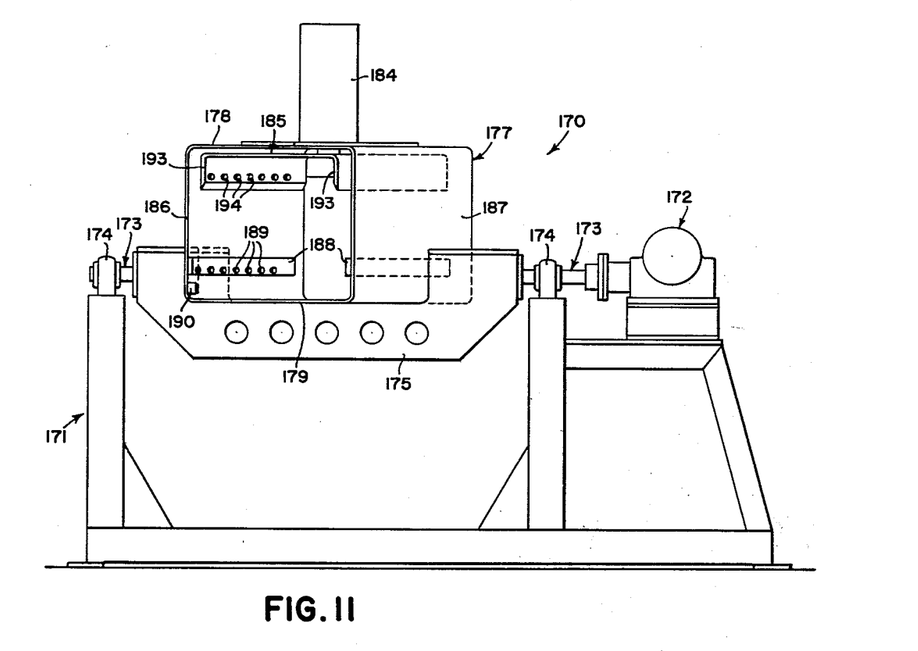

As best shown in FIGS. 1a and 11, the roll-over unit 170 comprises a supporting framework 171 carrying a double cylinder air motor 172 connected to rotate shaft means 173 supported in bearings 174 and carrying a cage or support 177. Forming a part of the shaft means 173 is a cage-supporting truss 175. The cage or support 177 includes opposite upper and lower walls 178 and 179. Wall 178 carries an air cylinder 184 on the piston of which is connected with a generally vertical shiftable flask-engaging head 185. The side walls, shown at 186 and 187, carry bars 188, each of which supports a series of rollers 189, and the wall 186 carries a flask stop 190.

Referring again to FIG. 10, a horizontal unloader cylinder 197 is carried by the supporting framework 81 of the blow unit 70 and the piston of the cylinder 197 carries a head 198 that, in operation, serves to advance a back-up member 31, with shell therein, from the stripping carrier 152 across the support 166 into the roll-over cage 177 where it is supported on the rollers 189. The stop 190 serves to determine the end position of the back-up member in the cage 177. When the backing member 31 is in position in the roll-over cage the cylinder 184 is energized so as to bring the head 185 down against the backing member. The head 185 includes side flanges 193, each of which carries a series of rollers 194 that engage the sides of the backing member and the power exerted by the cylinder 184 acts to lock the back-up member in the cage 177 so as to hold the back-up member in place during the inversion or reversal of the cage 177. After the flask or back-up member is thus secured in the cage 177, the air motor 172 is operated to rotate the cage and back-up member through 180°. As will be understood from FIGS. 10 and 11, the cage 177 is so formed that the lower wall 179 is located at an elevation such as to receive the back-up member directly from the stripper head 152 when the latter is in its elevated position. After the cage 177 is inverted or rolled over, as by the operation of the roll-over air motor 172, the clamping head 185 is now at the lower side of the roll-over unit and is located so as to be substantially at the same level as the receiving end portion 199 of the conveyor 200 (FIG. 1a), whereby the back-up member may now be advanced by a pusher cylinder 205, mounted exteriorly of the index table 71, FIG. 1a, from the cage 177 onto the conveyor 200. The latter leads to the core setting station D (FIG. 1a). As will be seen from the latter figure, the unit 170 is so arranged that the shaft 173 bisects the angle between the longitudinal axis of the portion 199 of the conveyor 200 next the roll-over unit 170 and the direction of movement of the back-up advancing cylinder 197 (FIG. 10) that shifts the back-up member from the stripping head 152 over into the cage 177. Thus, the unit 170 serves to receive the back-up member as is stripped from the pattern member, raised and then moved into the roll-over cage 177, so that by merely rotating the latter through 180°, the back-up member then in a position to be shifted directly onto the receiving end 199 of the conveyor 200 that leads to the core-setting station D, the back-up member being inverted, now resting on the conveyor 200 with the open side upwardly and thus in a position to receive cores or other parts that may be required.

Figure 12:
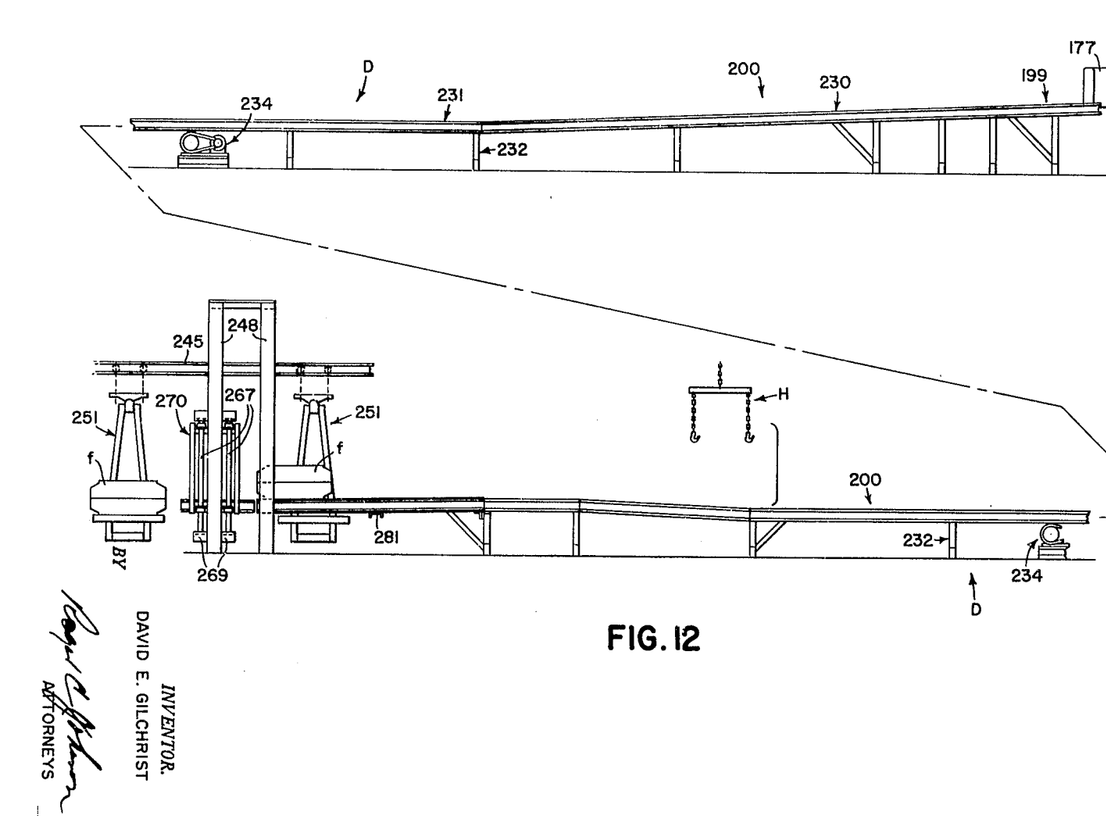
FIG. 12 is an elevation of the conveyor leading from the flask inverting unit to the unit for picking up the assembled and clamped backing members that are ready to go to the pouring station.

As best shown in FIG. 12, the conveyor 200 includes a number of sections. The sections 199 and 230 have a gradient such that the back-up members as they emerge from the roll-over cage 177 move by gravity down the conveyor section 230 toward the central portions 231 of the core setting conveyor. Here, the conveyor is generally horizontal and comprises a suitable framework 232 supported on the floor and carrying a plurality of rollers 233 (FIG. 1a), all suitably connected to be driven by a motor or other suitable source of power 234 (FIG. 12). It will be remembered that the back-up members are supported on the core setting conveyor with their open portions facing upwardly, and this disposes the flanges 41 downwardly so that the flanges 41 form the portions of the back-up members that contact the rollers 233 of the conveyor, thus protecting the machined faces 38 of the back-up members 31 from being scratched or marred, which, if permitted, might be the cause of leakage of the sand-resin mixture during the blowing operation.

Figure 13:
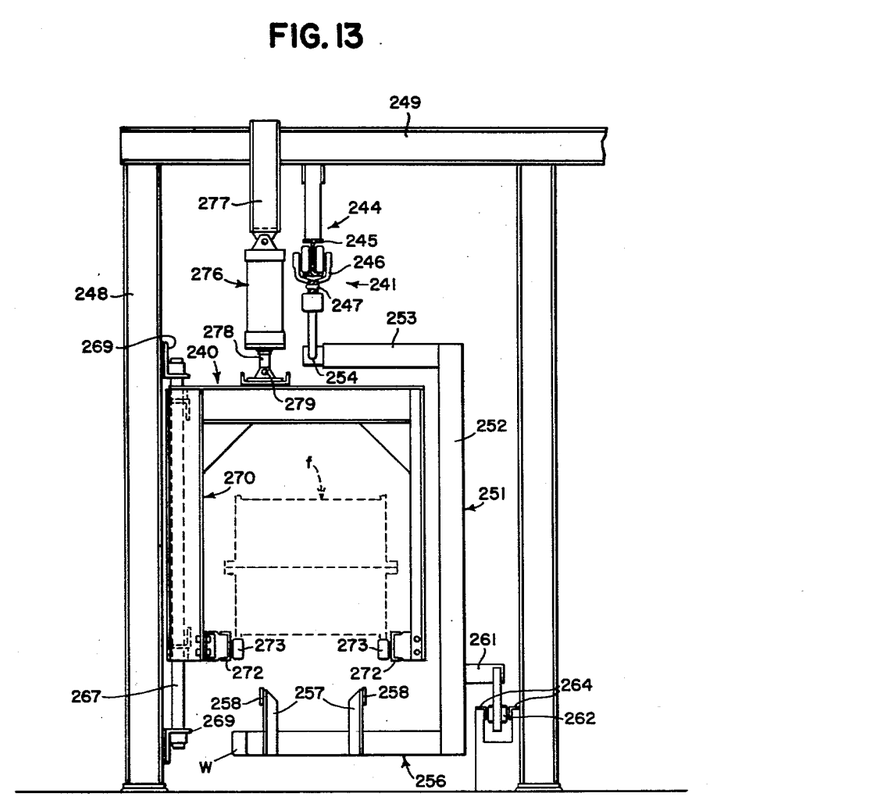
FIG. 13 is an enlarged view, taken generally along the line 13—13 of FIGS. 1a and 12, showing the mold or flask transfer unit and one of the pendant type overhead carriers that move the flasks into and through the pouring station and around to the shakeout station.

In the passage of back-up members along the conveyor sections 231 one or more operators stationed adjacent thereto insert whatever cores and/or other required parts into the shells. Also, if any repair work needs to be done on any of the shells it can be performed at this station. As the back-up members that move along the conveyor section 230 toward the flask assembly station E, they approach a power operated hoist H (FIG. 12) and by the use of this unit each cope back-up member is engaged by the hoist H, lifted off the conveyor and, guided by the operator, is then assembled on an adjacent drag back-up member. The operator then locks the two back-up members together to form a complete flask. The completed flask, indicated by the reference character f in FIGS. 12 and 13, is then moved toward a flask transfer mechanism indicated in its entirety by the reference numeral 240. The purpose of this mechanism is to transfer each flask from the conveyor 230 onto a continuously moving overhead trolley conveyor mechanism indicated at 241. Details of this means will be described below.

As will best be seen in FIGS. 1 and 13, the overhead conveyor trolley arrangement includes an overhead track 244 that comprises I-beam sections 245 on which wheeled hangers 246 are movable. Chain links, one which is shown at 247 in FIG. 13, interconnect the wheeled carriages 246, and suitable drive means (not shown) is connected with the chain links for shifting the trolley carriages 246 along the I-beam support 245. The latter is supported by suitable framework, including structural columns 248 (FIG. 13) and cross beams 249.

Supported on each of the trolley carriages 246 is an L-shaped pendant type flask-receiving carrier 251. Each carrier 251 comprises a pair of generally vertical upwardly converging channels 252 connected rigidly to one end of a cross arm 253, the other end of which is swingably connected, as by pivot 254, with the lower portion of the associated trolley carriage 246. The lower portion of the carrier 251 is made up of a generally horizontal framework 256 that includes pairs of vertical struts 257, the upper end of which receive a pair of flask-engaging bars 258. The parts are so arranged that, with a weight W, a flask f carried by the bars 258 will be supported substantially directly underneath the pivot 254.

Each of the carriers 251 is provided at its rear side with a bracket 261 on which rollers 262 are supported. These rollers are adapted to pass into the space between a pair of bars 264 carried by the adjacent stationary framework in laterally spaced apart relation whereby the bars 264 may serve as trolley guide means for accurately locating each flask carrier 251 as it approaches a station, such as the flask transfer station F mentioned briefly above.

The flask transfer mechanism 240 will now be described. As best shown in FIG. 13, the framework, including certain of the columns 248, carries a pair of guide rods 267 held in place by pairs of angle brackets 269, and movable generally vertically along the guide rods 267 is an inverted U-shaped carrier frame structure 270 that is located at the end of the conveyor 200, just beyond the flask assembly station E. The unit 270 is in the nature of a vertically shiftable flask carrier, carrying at its lower portion spaced apart channels 272 on which rollers 273 are journaled. The elevator frame 270 is raised and lowered along the guide rods 267 by suitable power means, such as a cylinder 276 (FIG. 13) supported from a vertical bracket 277 that forms a part of the general framework. The piston 278 of the power unit is pivotally connected, as in 279, with the upper portion of the elevator unit 270. When the cylinder 276 is retracted, the unit 270 is located so that flasks, completely assembled and containing all necessary cores and the like, with the back-up members or cope and drag sections securely locked together, may enter the unit 270 from the end of the conveyor 200. Suitable power means is provided for transferring the completed and locked flasks from the conveyor 200 on to the elevator 270, and such means will now be described.

Figure 14:
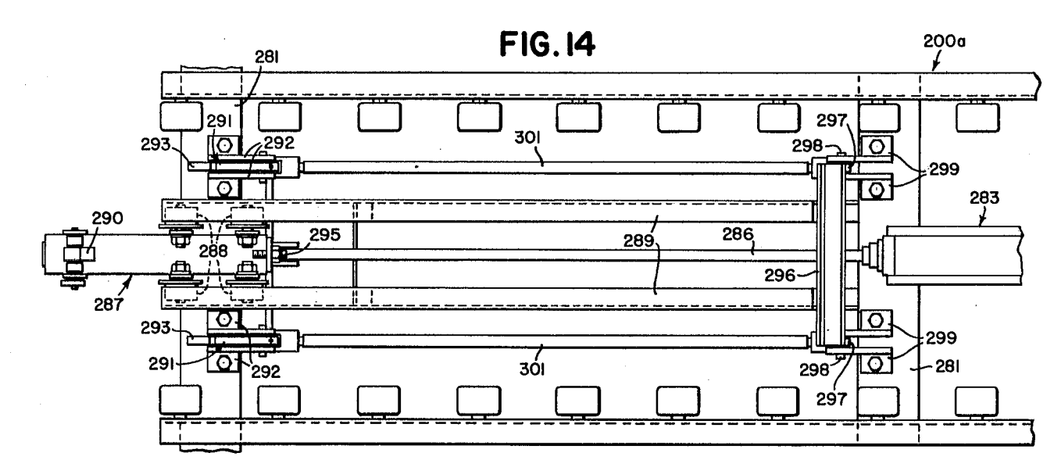
FIG. 14 is a sectional view taken generally along the associated parts.
Figure 15:
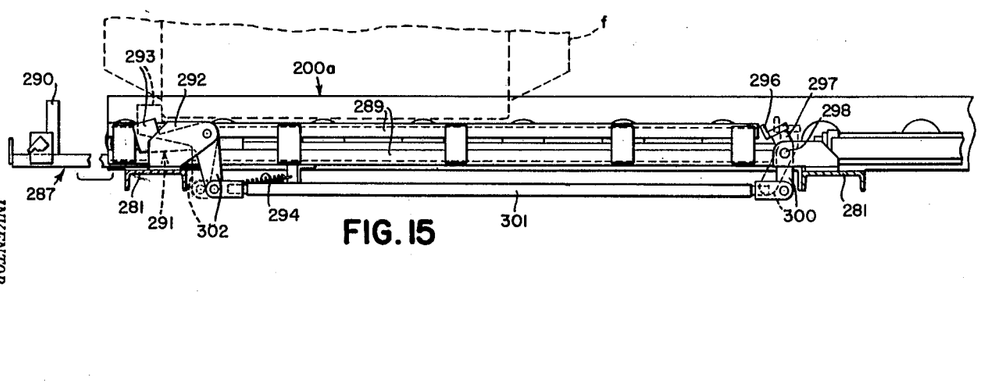
FIG. 15 is a sectional view taken generally along the line 15—15 of FIG. 14.

Referring first to FIG. 14, it will be seen that the end of the conveyor 200 is provided with a terminal conveyor portion 200a (FIG. 1a) having a number of cross-channels 281, one of which is provided with suitable trunnion means 282 (FIG. 1a) by which an air cylinder 283 is supported. The cylinder 283 is disposed generally horizontally and the piston rod 286 of the cylinder 283 is connected to a pusher carriage 287 that is supported by suitable rollers 288 moving along pairs of upper and lower angles 289 carried in any suitable way by the associated cross-channels 281. The outermost portion of the pusher carriage 287 is provided with a pivoted flask-advancing dog 290 that, in the position shown in FIG. 15, is disposed so as to engage an end of an associated flask and shift the same from the terminal portion of the conveyor 200a over onto the rollers 273 (FIG. 13) of the flask transfer carrier unit 270, it being assumed that the latter is in the upper position (FIG. 13), being moved to and held in that position by the power cylinder 276. After the carrier 270 receives a flask as just described, the carrier is then lowered by extending the cylinder 276 so as to deposit the flask onto the trolley carrier bars 258, which are at that time directly underneath. This is accomplished by means of a suitable timing mechanism which may be of any generally conventional construction, that is actuated from the trolley carriage in such a way that the cylinder 276 is not actuated to lower the carrier 270 until exactly the right moment when the trolley carrier bars 258 are in a position to receive the flask. The range of movement of the elevator carrier 270 is such that after a flask is deposited onto the bars 258, the carrier 270 moves downwardly an additional distance so as not to interfere with the horizontal advance of the flask, now supported on the trolley carrier, toward the pouring station.

Suitable means is provided for preventing the flask from being moved off the terminal end of the conveyor 200a when, for example, a transfer carrier 270 is not in a position to receive a flask. Referring again to FIGS. 14 and 15, we provide a pair of pivoted dogs or stops 291 that are swingably carried by suitable bracket means 292 fixed to the associated channel 281 laterally outwardly of the pusher carriage supporting angles 289. The stops 291 have flask-engaging portions 293 that, in the elevated position thereof, serve to prevent a flask, shown in dotted lines in FIG. 15, from being moved accidentally off the conveyor 200a into the flask transfer mechanism.

The stops 293 must be lowered when the cylinder unit 283 is to be extended to push a flask onto the carrier 270 when the latter is in the proper position to receive a flask. To this end, the pusher frame 287 carries an adjustable abutment 295 (FIG. 14) that, in the retracted position of the cylinder 283, engages a crossbar 296 (FIG. 15) that is supported on a pair of swingable arms 297, pivoted, as at 298, to bracket means 299 carried by the adjacent channel 281. The lower ends 300 (FIG. 15) of the pivoted arms 297 are connected by links 301 with the lower arms 302 of the pivoted stops 291. Thus, when the piston rod 286 is completely retracted in the cylinder 283, the adjustable abutment 295 acts through the bar 296 and the pivoted arms 297 to move the flask-stop portions 293 into the upper or flask-engaging positions against the action of the spring means 294. However, the initial movement of the piston rod 286, away from the cross bar 296, which occurs before the pusher frame 287 and pusher dog 290 is brought up against a flask, serves to release the cross bar 296 and thus permits the spring means 294 to retract the stop dog sections 293 so that movement of the flask as propelled by the cylinder 283 is not restricted. When the flask on the elevator 270 is lowered, the flask is deposited at the right time onto the adjacent slowly moving trolley carrier 251, whereupon the latter transports the associated flask away from the flask assembly station toward the pouring station.

At the pouring station F (FIG. 1) molten iron or other metal is poured into the flasks to form the desired casting as the trolley carriers move along the track 244. During the further movement of the flask, now containing molten iron, the heat of the latter as the casting sets up and starts to cool serves to burn out the resin of the shell molds so that by the time the flasks with their contained castings reach the shake-out station G, the cope back-up member can be lifted off the drag back-up member by the hoist 75 (FIG. 1). The cope back-up member is then moved by the hoist over onto a jolt machine 315 so that any adhering sand is shaken therefrom. The sand discharged from the jolt machine 315 is delivered onto the receiving portion of a sand conveyor 316, which, as best shown in FIG. 1, conveys the sand upwardly and away from the machine 315 to a storage unit 317 where the sand is held for reuse. The cleaned cope back-up member is then removed from the jolt machine 315 and deposited onto a conveyor section 320 (FIG. 1) from which the back-up member moves by gravity back into the ovens 12, as required, by suitable operation of a pusher unit 45 (FIG. 1a). The drag back-up member is handled in substantially the same way.

While I have shown and described above the preferred structure in which the principles of the present invention has been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. In shell molding utilizing a plurality of cope and drag patterns, a rotatable table carrying said patterns, a stationary blow machine having a blow head, a plurality of cope and drag back-up members, and conveyor means adapted to carry said back-up members toward and away from said rotatable table: the steps of continuously heating said patterns while moving said table to carry said patterns consecutively under said blow head, transferring said cope and drag back-up members from said conveyor to said table and placing them on the heated patterns on said table from a shake-out zone while said members still contain heat from the previous pouring operation, blowing a heat hardenable material into said cope and drag back-up members and against the associated patterns, rotating said table to carry said assembled patterns and back-up members from said blowing zone while maintaining said patterns at an elevated temperature, utilizing the heat in said patterns and back-up members to cure the shells within the back-up members while the back-up members and patterns move toward a stripping zone, removing said back-up members from the associated patterns, inverting said back-up members and placing them face-up on said conveyor means while leaving the patterns on said table, rotating the table to carry the patterns back toward said blowing zone, moving the conveyor to carry the back-up members in alternate cope and drag sequence with shells therein toward a flask-forming station, assembling each pair of cope and drag back-up members to form a flask, removing said assembled flasks from said conveyor means and shifting said assembled flasks to a pouring zone, pouring molten metal into each flaks to form a casting, removing said back-up members from said casting, replacing said back-up members on said conveyor means, and moving said conveyor means to carry said back-up members toward the said rotatable table.

2. Shell molding apparatus comprising a generally horizontal rotatable turntable, a framework overlying said turntable, a blowing machine connected with said framework and including a downwardly facing blowing head overlying one portion of said turntable, means connected with the turntable for successively advancing said turntable, a plurality of patterns resting on but movable upwardly relative to said turntable, said patterns being carried in circumferentially spaced apart relation by said turntable, a plurality of backing members attachable to said patterns, respectively, and removable therefrom, backing member handling means carried by said framework at a point thereon spaced circumferentially of said turntable from said blowing head and located thereon so as to place a backing member on each of said patterns between successive advances of the latter toward the blowing machine, means at the blowing machine to bring a pattern and associated backing member against said blowing head so as to receive a charge of shell-forming material therefrom, means carried by said framework above said turntable and in spaced relation from said blowing machine for removing each backing member from the associated patterns, and means disposed below said backing member removing means and acting on the associated pattern for locking said pattern to the turntable to facilitate removing the associated backing member with cured shell therein from the turntable.

3. Shell molding apparatus as defined in claim 2, further characterized by a backing member conveyor disposed in a position to receive backing members from said backing member removing means, and means carried by said framework for moving said backing members successively toward said backing member conveyor.

4. Shell molding apparatus as defined in claim 2, further characterized by said backing member removing means including elevatable means adapted to engage a backing member and lift the same upwardly off the associated pattern, and power operated means carried by said framework and adapted in the upper position of the elevatable means to engage a backing member thereon and shift the backing member generally horizontally off said elevatable means.

5. Shell molding apparatus as defined in claim 4, further characterized by said backing member conveyor being disposed adjacent but spaced from said elevatable means, a rollover apparatus disposed between the elevatable means and said conveyor and adapted to receive a backing member from said elevatable means and reverse said latter member before delivery to said conveyor and means disposed adjacent the rollover apparatus for shifting a backing member after inversion by the rollover apparatus to said backing member conveyor.

6. Shell molding apparatus as defined in claim 5, further characterized by said backing member conveyor being below the level of said elevatable means in its upper position, and said rollover apparatus including a backing member receiver swingable about an axis located off-center whereby in one position of said backing member receiver the latter is in a position to receive a backing member from said elevatable means in its upper position and in the other position of said backing member receiver the latter is in a position corresponding to the level of said backing member conveyor.

7. Shell molding apparatus as defined in claim 5, further characterized by means on said rollover apparatus to clamp a backing member thereto in fixed relation during the rollover operation.

8. Shell molding apparatus as defined in claim 7, further characterized by said rollover apparatus including a supporting cage having means receiving one side of a backing member and clamp means including a movably mounted clamping head engageable with the other side of said backing member to hold the latter rigid with said cage during the rollover operation.

9. In shell molding apparatus the improvement comprising a rotatable turntable having circumferentially spaced apart pattern-receiving means thereon, means connected with said turntable to periodically advance the latter, a plurality of patterns carried by and movable with said turntable, said patterns being liftable off said turntable, downwardly extending means connected with said patterns and accessible from points below said turntable, a blowing machine having a blowing head disposed in overhanging relation relative to the patterns on said turntable but spaced above the patterns so as to accommodate generally horizontal movement of the latter relative to the blowing machine when the turntable is rotated, a plurality of backing members, a first conveyor section operative to bring backing members up to said turntable, means operative to remove backing members from said first conveyor section and place said backing members on said patterns successively, means connectible with each said pattern as successive advances of the turntable brings the pattern underneath the blowing head for raising each pattern and the associated backing member into leaktight relation with the blowing head, a second conveyor section adapted to receive backing members from said turntable, and means to lift said backing members from said turntable and place them on said second conveyor.

10. Shell molding apparatus comprising a stationary blowing machine adapted to carry a supply of shell-forming material, a rotatable turntable carrying a series of patterns in circumferentially spaced apart relation and movable to bring said patterns successively into operative material-receiving relation with respect to said blowing machine, means to maintain said patterns heated substantially continuously to shell-curing temperatures, a plurality of backing members, each adapted to be held against an associated pattern to form a shell-receiving space therebetween, a conveyor situated adjacent said blowing machine and adapted to deliver a heated backing member to said turntable for assembly with an adjacent pattern mounted on the turntable, movement of the latter serving to carry the assembled pattern and backing member into adjacency with said blowing machine to receive a charge of said material therefrom, the latter being cured by heat from said pattern and backing member, and means disposed along the path of movement of said turntable for removing a backing member, with cured shell therein, from the turntable, leaving the associated pattern on said turntable.

11. Shell molding apparatus comprising a stationary blowing machine adapted to carry a supply of shell-forming material, a rotatable turntable carrying a series of patterns in circumferentially spaced apart relation and arranged with their shaped surfaces facing upwardly, said turntable being movable to bring said patterns successively into operative material-receiving relation underneath the blowing head of said blowing machine, means to maintain said patterns heated substantially continuously to shell-curing temperatures, a plurality of backing members, each adapted to be held against an associated pattern to form a shell-receiving space therebetween, a conveyor for said backing members, each of the latter having a shell-receiving portion adapted to overlie the associated pattern surface in spaced relation and each backing member being heated to shell curing temperature, backing member transfer means adapted to receive a backing member from said conveyor and place the backing member over an adjacent pattern, means to raise each assembly of pattern and backing member into sealed relation with said blowing head when the advance of said turntable carries each assembly to the blowing machine, whereby operation of the latter discharges material into the space between the pattern and backing member and said material being cured therein to form a shell in said backing member, a second conveyor situated adjacent said turntable, and means to lift each backing member in succession, with cured shell therein, off the associated pattern and place the backing member in shell-up position on said second conveyor.

12. In shell molding apparatus utilizing patterns and backing members, the improvement that includes a rotary turntable carrying said patterns for limited vertical movement relative to the turntable, a blowing machine disposed adjacent the turntable and including a blow head overhanging said turntable, means disposed over said turntable but spaced from said blowing machines for placing a backing member on each pattern, means movable relative to the turntable and engageable with each pattern as it reaches the blowing machine to raise the pattern and the backing member to bring the latter up into contact with the blow head and to lower the pattern and backing member away from the blow head after the blowing machine has injected shell-forming material into said backing member, means disposed above said turntable and located at a point in the path of movement of the turntable spaced from said blowing machine for engaging each backing member and removing the latter and the shell formed therein from the associated pattern, stationary abutment means disposed in a position at said point to overlie portions of each pattern as the latter reaches said point, and means located at said point for raising each pattern up against said abutment means so as to lock said pattern against movement when the associated backing member is removed therefrom.

13. In shell molding apparatus, as defined in claim 12, the further improvement that includes conveyor means leading from said turntable, and means disposed generally between said turntable and said conveyor for receiving the backing members from said backing member engaging and removing means, inverting the backing members, and depositing the latter on said conveyor in a position to receive cores or the like.

14. In shell molding apparatus as defined in claim 13, further characterized by said conveyor having a generally level core-setting portion and an inclined portion receiving the backing members from said backing member inverting means and providing for their movement by gravity down said inclined portion to said core-setting portion.

15. In shell molding apparatus utilizing heated patterns, each having a shaped face, and heated backing members, each backing member having a shell-receiving-concavity at one side and aperture means leading from the other side of the backing member to said concavity, said other side being smooth, the improvement comprising a rotatable turntable carrying a plurality of said patterns in an upwardly facing position, means to deliver said backing members to said turntable in seriatim with said concavities facing downwardly, means engageable with said backing members to place each backing member onto the associated pattern with the shell-receiving concavity facing the shaped face of the pattern, a blowing machine having a downwardly facing blow head, means to raise each pair of assembled pattern and backing member upwardly to said blow head with the smooth side pressed into leak-tight relation with said blow head and with said aperture means in communication with the blow head to receive a charge of shell-forming material therefrom, means engageable with each backing member after a shell has been formed for lifting the backing member off the associated pattern, means to invert the lifted backing member, a core setting conveyor, means to place each backing member on said conveyor with the shell formed therein facing upwardly, and projecting means on said other side of each backing member to engage the conveyor and thereby prevent said smooth blow head receiving surface from contacting parts of the conveyor.

16. In shell molding, the improvement defined in claim 15, further characterized by said projecting means comprising flanges at opposite sides of said smooth surface and extending outwardly thereof.

17. In a molding apparatus utilizing cope and drag backing members, the improvement comprising a first conveyor, means adapted to place upwardly facing cope and drag backing members in alternate sequence on said first conveyor, whereby said backing members may receive any necessary cores or the like, means disposed adjacent said first conveyor to invert and place one of said cope and drag backing members onto an adjacent backing member to form a flask, each flask including a cope backing member and a drag backing member, a second conveyor lower than said first conveyor and leading from said first conveyor to a pouring zone, and a transfer unit at the end of said first conveyor to receive each flask therefrom and shift the flask onto said second conveyor, said transfer unit comprising a downwardly movable carrier positioned to receive flasks from said first conveyor and to lower them onto said second conveyor.

18. In a molding apparatus as defined in claim 17, the further improvement comprising said second conveyor having flask-receiving portions disposed below the level of said first conveyor at a point in line with and spaced horizontally from the end of said first conveyor, and said transfer unit including vertically movable means disposed in the space between the end of said first conveyor and said second conveyor and adapted to receive a flask from said first conveyor and lower the flask onto a flask-receiving portion of said second conveyor.

19. A molding apparatus as defined in claim 17, in which said second conveyor includes an upper trolley track and a plurality of generally C-shaped carriers movably supported at their upper ends on said track, each C-shaped carrier having a lower flask-receiving portion movable underneath a part of said first conveyor, said transfer unit including a vertically movable flask carrier having spaced apart means adapted to receive a flask from said first conveyor, and said lower flask-receiving portion of said C-shaped carrier being dimensioned to move into the space between the spaced apart means of said vertically movable flask carrier to receive a flask therefrom when the flask carrier is lowered.

20. In shell molding apparatus, the combination of a plurality of patterns, a plurality of backing members, a stationary blowing machine adapted to carry a supply of shell-forming material, a rotatable turntable carrying means to receive a circumferentially spaced apart series of said patterns, said turntable being horizontally rotatable to bring said patterns successively into operative material-receiving relation with respect to said blowing machine, conveyor means movable toward said turntable to deliver a series of said backing members to a point adjacent said turntable, means at the delivery end of said conveyor to transfer said backing members to said turntable, including means to place a backing member on each pattern, movement of said turntable serving to carry each assembled pattern and backing member into operative adjacency with said blowing machine to receive a charge of said material therefrom, means disposed along the path of movement of said turntable for removing the backing members, one at a time, from the associated patterns, means adjacent said removing means for locking each pattern to said turntable when the associated backing member is removed therefrom, a rollover apparatus disposed to receive said backing members from said backing member removing means and serving to reverse each backing member, a second conveyor having a receiving end adjacent said rollover apparatus and a discharge end, means to move each backing member from said rollover apparatus to said receiving end of the second conveyor, a movable flask conveyor disposed adjacent the discharge end of said second conveyor, and means between said flask conveyor and said discharge end of the second conveyor for shifting a flask from the second conveyor to said flask conveyor.

21. The invention set forth in claim 20, further characterized by releasable means holding a flask at said discharge end of said second conveyor, and means actuated by said flask shifting means to release said releasable means.

22. The invention set forth in claim 20, further characterized by said rollover apparatus comprising a backing member receiving cage, and means carried thereby for locking a backing member in said cage.

23. In shell molding utilizing a plurality of cope and drag patterns, a rotatable table carrying said patterns, a stationary blow machine having a blow head, a plurality of cope and drag back-up members and conveyor means adapted to carry said back-up members toward and away from said rotatable table: the steps of continuously heating said patterns while moving said table to carry said patterns consecutively under said blow head, transferring said cope and drag back-up members from said conveyor to said table and placing them on the heated patterns on said table, blowing a heat hardenable material into said cope and drag back-up members and against the associated patterns, rotating said table to carry said assembled patterns and back-up members from said blowing zone while maintaining said patterns at an elevated temperature, utilizing the heat in said patterns and back-up members to cure the shells within the back-up members while the back-up members and patterns move toward a stripping zone, removing said back-up members from the associated patterns, inverting said back-up members and placing them face-up on said conveyor means while leaving the patterns on said table, rotating the table to carry the patterns back toward said blowing zone, moving the conveyor to carry the back-up members in alternate cope and drag sequence with shells therein toward a flask-forming station, assembling each pair of cope and drag back-up members to form a flask, removing said assembled flasks from said conveyor means and shifting to a pouring zone, pouring molten metal into each flask to form a casting, removing said back-up members from said casting, replacing said back-up members on said conveyor means, and moving said conveyor means to carry said back-up members toward the said rotatable table.

24. Shell molding apparatus comprising a generally horizontal rotatable turntable, a framework overlying said turntable, a blowing machine connected with said framework and including a downwardly facing blowing head overlying one portion of said turntable, means connected with the turntable for successively advancing said turntable, a plurality of patterns carried by said turntable in circumferentially spaced apart relation, each of said patterns being movable vertically relative to said turntable, a plurality of backing members attachable to said patterns, respectively, and removable therefrom, said backing members being movable vertically, respectively, with said patterns, backing member handling means carried by said framework at a point thereon spaced circumferentially on said turntable from said blowing head and located thereon so as to place a backing member on each of said patterns between successive advances of the latter toward the blowing machine, means at the blowing machine to lift each pattern and the associated backing member into leak tight relation with the blowing machine, means at the blowing machine and operative after each pattern and the associated backing member have been lifted into leak tight relation with the blowing machine to direct a charge of shell-forming material into the space between a pattern and its associated backing member, means to lower each pattern and associated backing member after the blowing of the charge of shell-forming material is completed, and means carried by said framework above said turntable and in spaced relation generally horizontally from said blowing machine for removing each backing member from the associated pattern.

25. Shell molding apparatus as defined in claim 24, further characterized by means on the turntable to lock the patterns thereto, and means adapted to engage a backing member and remove the backing member from the associated pattern after the latter has been locked to the turntable.

26. In shell molding apparatus, the improvement comprising a rotatable turntable having circumferentially spaced apart pattern-receiving means thereon, means connected with said turntable to periodically advance the latter, a plurality of patterns carried by and movable with said turntable, said patterns being liftable off said turntable, downwardly extending means connected with said patterns and accessible from points below said turntable, a blowing machine having a blowing head disposed in overhanging relation relative to the pattern on said turntable but spaced above the patterns so as to accommodate generally horizontal movement of the latter relative to the blowing machine when the turntable is rotated, a plurality of backing members, a first conveyor section operative to bring backing members up to said turntable, means operative to remove backing members from said first conveyor section and place said backing members on said patterns successively, means connectible with each said downwardly extending means as successive advances of the turntable brings the pattern underneath the blowing head for raising each pattern and the associated backing member into leaktight relation with the blowing head, and means engageable with said backing members for lifting them and the shells included therein from said turntable.

27. In a molding appartus utilizing cope and drag backing members, the improvement comprising a first conveyor adapted to receive upwardly facing cope and drag backing members in alternate sequence, whereby to receive any necessary cores or the like, means disposed adjacent said first conveyor to assemble said backing members into flasks, each flask including a cope backing member and a drag backing member, a second conveyor leading from said first conveyor to a pouring zone, said second conveyor comprising a plurality of trolley-supported pendent carriers having upwardly facing flask-receiving portions movable away from the adjacent end of said first conveyor, means to shift each flask from said first conveyor onto the flask-receiving portion of the associated pendent carrier, said means including flask-engaging means carried by said first conveyor to move each flask toward the adjacent pendent carrier, releasable flask-locking means to retain flasks on said first conveyor, and means operated by the initial movement of said flask-shifting means to release said flask-locking means.

28. In a molding apparatus utilizing cope and drag backing members, the improvement comprising a first conveyor adapted to receive upwardly facing cope and drag backing members in alternate sequence, whereby to receive any necessary cores or the like, means disposed adjacent said first conveyor to assemble said backing members into flasks, each flask including a cope backing member and a drag backing member, a second conveyor leading from said first conveyor to a pouring zone, and a transfer unit at the end of said first conveyor to receive each flask therefrom and shift the flask onto said second conveyor, said second conveyor having flask-receiving portions disposed below said first conveyor, said transfer unit including an extensible means carried at the discharge end of said first conveyor and engageable with each flask to move the latter from said conveyor to said transfer unit, latch means actuated by retracting movement of said extensible means for preventing movement of a flask off said first conveyor until said extensible means is extended, said latch means including a flask-engaging stop pivoted to the discharge end portion of said second conveyor, and an adjustable part carried by said extensible means, a stop-operating part movably carried by said first conveyor and spaced from said pivoted stop a distance greater than the length of a flask, and means interconnecting said stop-operating part and said flask-engaging stop whereby when the retracting movement of said extensible means carries said adjustable means into engagement with said stop-operating part the latter acts to position said flask-engaging stop in front of a flask approaching the discharge end of said first conveyor.

References Cited in the file of this patent

UNITED STATES PATENTS

| | | |
|---|---|---|
| 1,595,784 | Hughes | Aug. 10, 1926 |
| 2,783,509 | Muller | Mar. 5, 1957 |
| 2,899,725 | Zink | Aug. 18, 1959 |
| 2,942,312 | Deakins et al. | June 28, 1960 |
| 2,945,272 | Boegehold | July 19, 1960 |
| 3,077,014 | Jennings et al. | Feb. 12, 1963 |
| 3,083,421 | Taccone | Apr. 2, 1963 |

UNITED STATES PATENT OFFICE
CERTIFICATE OF CORRECTION

Patent No. 3,152,371                           October 13, 1964

David E. Gilchrist

It is hereby certified that error appears in the above numbered patent requiring correction and that the said Letters Patent should read as corrected below.

Column 11, line 5, for "flaks" read -- flask --; column 16, line 20, for "pattern" read -- patterns --.

Signed and sealed this 13th day of April 1965.

(SEAL)
Attest:

ERNEST W. SWIDER
Attesting Officer

EDWARD J. BRENNER
Commissioner of Patents